(12) United States Patent
Logan et al.

(10) Patent No.: US 8,210,388 B2
(45) Date of Patent: Jul. 3, 2012

(54) CONTAINER FOR TRANSPORTING COMPRESSED GAS CYLINDERS

(75) Inventors: Robert Samuel Logan, Houston, TX (US); James Forrest Frazier, Friendswood, TX (US)

(73) Assignee: Airward Corporation, Houston, TX (US)

( * ) Notice: Subject to any disclaimer, the term of this patent is extended or adjusted under 35 U.S.C. 154(b) by 406 days.

(21) Appl. No.: 12/535,347

(22) Filed: Aug. 4, 2009

(65) Prior Publication Data

US 2010/0089918 A1    Apr. 15, 2010

Related U.S. Application Data

(60) Provisional application No. 61/086,531, filed on Aug. 6, 2008.

(51) Int. Cl.
*F17C 1/00* (2006.01)
*F17C 3/00* (2006.01)
*F17C 13/00* (2006.01)

(52) U.S. Cl. ............ 220/560.01; 220/560.1; 220/592.23

(58) Field of Classification Search .................. 220/4.21, 220/23.87, 560.01, 560.1–561.12, 592.23, 220/592.26; 206/446, 524.2
See application file for complete search history.

(56) References Cited

U.S. PATENT DOCUMENTS

| | | | | |
|---|---|---|---|---|
| 2,803,368 A | * | 8/1957 | Koch | 220/4.21 |
| 5,299,722 A | * | 4/1994 | Cheney | 224/404 |
| 6,039,203 A | * | 3/2000 | McDaniel | 220/562 |
| 6,595,383 B2 | * | 7/2003 | Pietrantoni | 220/586 |
| 6,967,051 B1 | * | 11/2005 | Augustynowicz et al. | 428/68 |

FOREIGN PATENT DOCUMENTS

| | | |
|---|---|---|
| EP | 1 291 300 | 3/2003 |
| JP | 56-103479 | 8/1981 |
| WO | 01/062623 | 8/2001 |
| WO | 2004/000693 | 12/2003 |

OTHER PUBLICATIONS

Notification of Transmittal of the International Search Report and the Written Opinion of the International Searching Authority or the Declaration (4 pages), International Search Report (3 pages), and Written Opinion of the International Searching Authority (3 pages) in counterpart application PCT/US2009/052924, mailed Mar. 31, 2010.
International Preliminary Report on Patentability in Application No. PCT/US2009/052924 dated Feb. 17, 2011, 5 pages.

* cited by examiner

*Primary Examiner* — Harry Grosso
(74) *Attorney, Agent, or Firm* — Fish & Richardson P.C.

(57) ABSTRACT

A reusable container which provides flame and thermal protection for shipping hazardous materials such as cylinders containing compressed gas has a flame resistant reinforced outer shell having a bottom section hingedly coupled to a top section. A first inner layer of thermal insulating material is fitted into the top and bottom sections of the outer shell. An optional second inner layer of shock absorbing material with thermal insulating properties is fitted next to the first inner layer and configured to contact and conform to surface sections of the compressed gas cylinder. An interior liner comprised of a durable liner constructed of fabric or molded heat-resistant plastic.

16 Claims, 3 Drawing Sheets

CONTAINER FOR TRANSPORTING COMPRESSED GAS CYLINDERS

CROSS REFERENCE TO RELATED APPLICATIONS

This application claims priority under 35 USC §119(e) to U.S. patent application Ser. No. 61/086,531, filed on Aug. 6, 2008, the entire contents of which are hereby incorporated by reference.

TECHNICAL FIELD

The present invention pertains to shipping containers for hazardous materials, and in particular an apparatus for shipping cylinders containing compressed oxygen, toxic gases, or oxygen generators.

BACKGROUND

In the handling and transporting of compressed gases stored in cylinders, it is known that exposure of the cylinders to heat may cause the pressure inside the cylinder to increase. It is also known to provide a pressure-relief mechanism that will open to vent the gas to the surrounding environment if the pressure within the cylinder reaches levels that may cause the cylinder to rupture.

There are instances, however, where it is advantageous to prevent the contents of the cylinder from being released. One such instance involves the transportation of compressed oxygen cylinders in cargo holds. If the cargo hold is provided with flame retardant walls and is sealed, the fire may smolder or suffocate before causing any serious damage. In such a situation, it would be disadvantageous to allow the oxygen inside the cylinders to release into the area surrounding the cylinders because the oxygen may provide fuel for the fire. Another problematic situation involves the shipment of toxic gases in cylinders or oxygen generators in cargo holds. It is also known that high temperatures may cause inadvertent actuation of oxygen generators.

For shipping cylinders containing compressed oxygen, it has been known to provide an outer packaging or over pack to protect the cylinders from reaching temperatures that may trigger the pressure-relief mechanism. It has been determined that a container constructed to ATA 300 requirements provides a minimal amount of thermal protection to a cylinder exposed to a high temperature environment. The ATA 300 container is an over pack or outer packaging commonly used by airlines to transport their oxygen cylinders (ATA specification No. 300, Packaging of Airline Supplies, Category 1). An ATA Specification No. 300 Category 1 (ATA 300) over pack or outer packaging is a resilient, durable over pack intended to be reused for a minimum of 100 round trips.

The existing ATA 300 containers have several drawbacks due to their lack of thermal protection. Accordingly, there is a need for a thermally protected over pack container that extends the time before a pressure relief mechanism on a compressed oxygen cylinder is triggered when the cylinder is exposed to elevated temperatures.

Marker and Diaz in DOT/FAA/AR-TN98/30 entitled *Evaluation of Oxygen Cylinder Over packs Exposed to Elevated Temperature* describe a modified Viking Corporation over pack containing thermal insulation. The over pack exterior consists of a heat-resistant thermoplastic known as Kydex. A 1-inch-thick fiberglass batt material is sandwiched between the exterior layer of Kydex and an additional layer of Kydex of the same thickness. A layer of polyethylene foam is glued to the internal layer of Kydex to provide impact resistance. After test initiation, the furnace temperature reached 400° F. in 10 minutes. The test was allowed to progress for approximately 60 minutes, at which point large quantities of smoke began to appear from the test furnace vents. The temperature of the cylinder surface never exceeded 90° F. during the test. A post test inspection revealed the source of the smoke was from the two ends of the over pack which had come in contact with the furnace heating elements. The heated thermoplastic lost some of its structural integrity, allowing the ends to sag and eventually come in contact with the furnace surface. In addition, the latch mounts had pulled away from the over pack due to the rivets pulling through the heat-softened thermoplastic exterior, exposing the fiberglass insulation. The interior of the over pack was undamaged.

A subsequent test was performed on an upgraded version of the thermally protected over pack. The new design utilized aluminum-faced rigid insulating foam in place of the fiberglass batting. External and internal layers of Kydex surrounded the rigid foam. After loading the charged cylinder into the new-design over pack, the furnace was activated and the temperature approached 400° F. in approximately 15 minutes. During the test, the temperature of the cylinder surface reached a maximum of 210° F. at 90 minutes, at which point the test was terminated. A post test inspection revealed the external layer of Kydex had melted and burned in several locations, exposing the aluminum foil face of the rigid foam insulation panel which had remained intact. The inner layer of Kydex was slightly warped but had not changed color. Although the cylinder surface temperatures were kept relatively low, the cylinder and valve assembly had become slightly discolored as a result of combustion of the Kydex and possibly the rigid foam panel. Due to a malfunction with the data acquisition, the temperature versus time data obtained during the test could not be retrieved. However, these data were observed during the test and indicated a gradual increase of the cylinder surface temperature up to a maximum of 210° F. at 90 minutes. The primary disadvantage of these over packs was the outer container material was made of Kydex, a material not capable of withstanding direct exposure to flame. Thus, the Kydex eventually melted and/or ignited.

U.S. Pat. No. 6,595,383 describes a single use over pack and a method for packing a compressed gas cylinder in an over pack, which provides thermal protection that is the same as or better than the ATA 300 Class III. Unfortunately, this device has the drawbacks of single use, pollution causing flame resistant treated cardboard and inconvenient cylinder loading characteristics.

SUMMARY

Embodiments of the present invention provide a reusable shipping container and a method for packing a compressed gas cylinder or oxygen generator in a shipping container that provides thermal and structural protection that is the same as or better than the ATA 300 and CFR 49, Part 178, but is more convenient to use and to manufacture.

An outer container is made of direct flame resistant material such as stainless steel opening in a clamshell fashion. The outer container has a first inner layer of high temperature thermal insulation material such as silica fiber insulation or silica aerogel. A second inner layer composed of aluminum faced fiberglass batting may be used to provide shock as well as additional thermal protection if required for a specific application. A liner made from polyester fabric or other suitable material such as a formed heat-resistant plastic comprises the inner layer, which receives the compressed gas cylinder. Additional foam (e.g., Minicell foam) may be used to secure the cylinder inside the liner and provide protection during handling.

The clamshell opening provision of the outer container permits easy and safe insertion and extraction of the compressed gas cylinder in contrast to end loading containers where the user of the container would have to lift the entire length of the compressed gas cylinder out of the over pack. A serpentine lid closeout located around the lip of the clamshell lid prevents ingress of hot external gasses and provides structural rigidity.

The details of one or more embodiments of the invention are set forth in the accompanying drawings and the description below. Other features, objects, and advantages of the invention will be apparent from the description and drawings, and from the claims.

DESCRIPTION OF DRAWINGS

The invention is illustrated in the drawings in which like reference characters designate the same or similar parts throughout the figures of which.

DETAILED DESCRIPTION

The present invention now will be described more fully hereinafter with reference to the accompanying drawings, in which an embodiment of the invention is shown. This invention may, however, be embodied in many different forms and should not be construed as limited to the embodiment set forth herein. Rather, this embodiment is provided so that this disclosure will be thorough and complete, and will fully convey the scope of the invention to those skilled in the art. Like numbers refer to like elements throughout.

Figure 1:
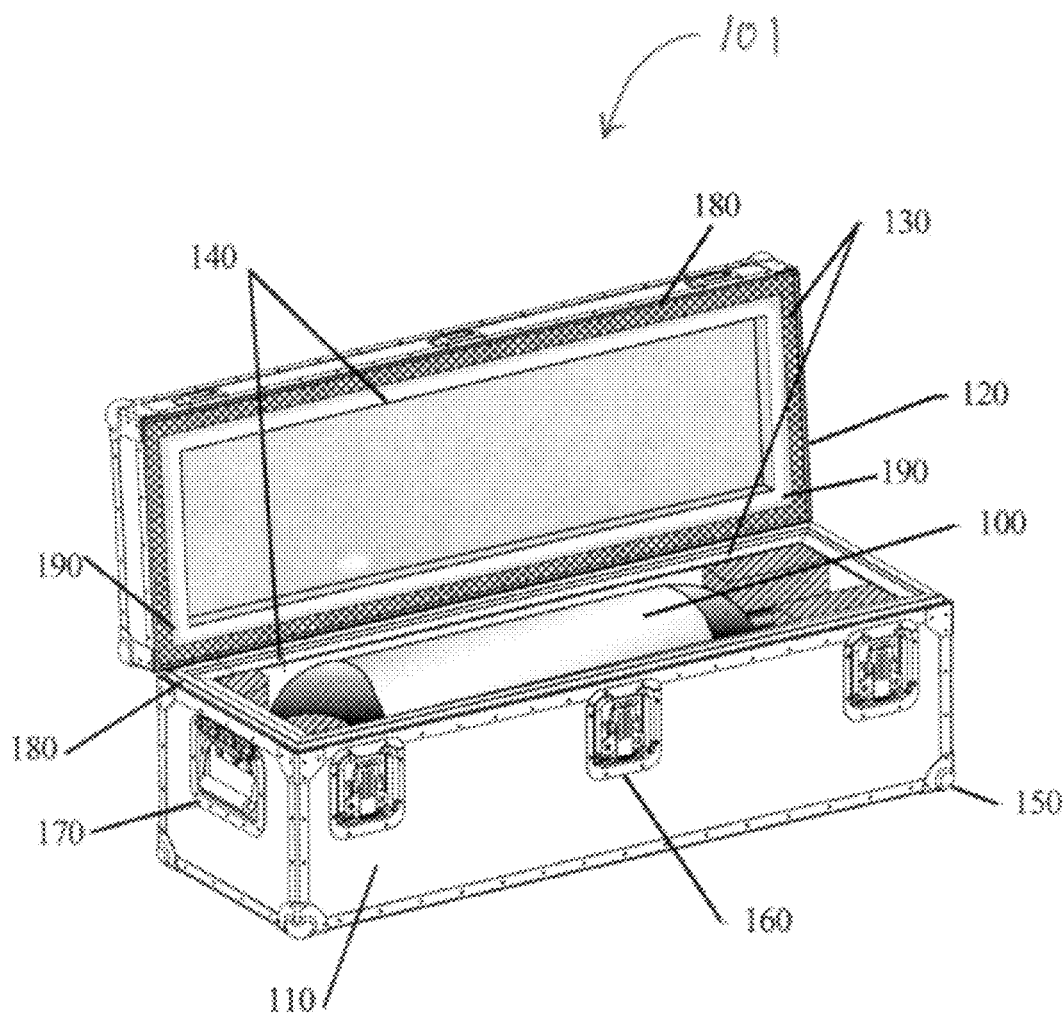
FIG. 1 is a perspective view illustrating a gas cylinder container with a stored cylinder.
Figure 2:
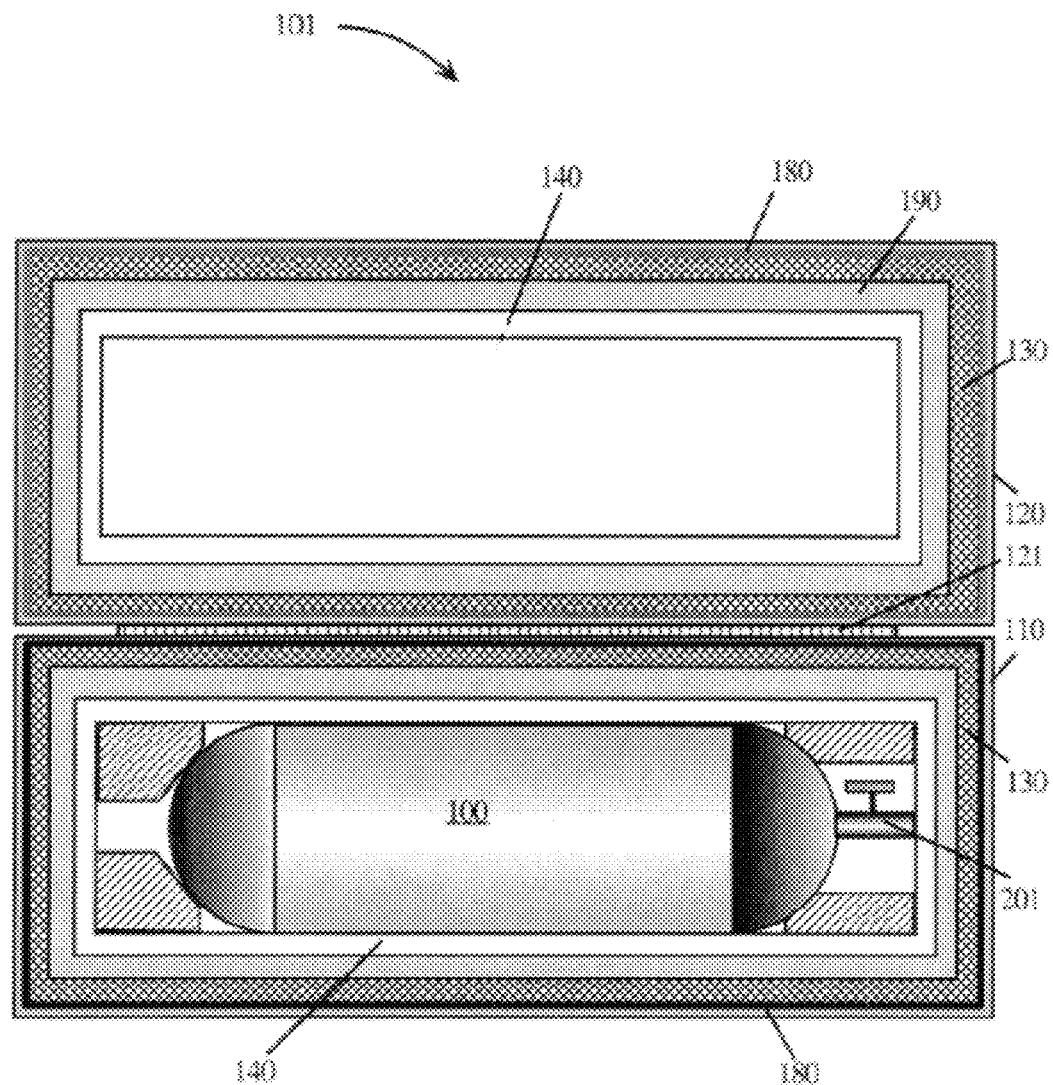
FIG. 2 is a top view of the gas cylinder container with the lid fully opened showing a stored gas cylinder and various protective layers.

Referring to FIGS. 1 and 2, a compressed gas cylinder 100 of the type typically used to store gases under pressure is shown. Alternatively, 100 may be an oxygen generator. As known to those of ordinary skill in the art, the storage cylinder 100 is constructed of materials such as steel or aluminum and which may incorporate fiber reinforcement, such as fiberglass or carbon fiber, and having sufficient strength to withstand internal pressures associated with compressed gases. The shape of the cylinder 100 and the gas stored inside of the cylinder 100 are variable. By way of example, the cylinder 100 is filled with compressed oxygen. It is known by those of ordinary skill in the art to provide these types of storage cylinders 100 with a valve at the inlet to cylinder 100. Cylinder 100 may also contain a pressure-relief mechanism 201 such as a burst disk that will release gas contents from cylinder 100 in response to a certain level of internal pressure in cylinder 100. The pressure relief mechanism 201 provides for escape of gas from inside cylinder 100 to the surrounding area before the internal pressure reaches a level that would cause explosive rupture of cylinder 100. Exposure of cylinder 100 to high temperatures is one of the conditions that may lead to a build up of pressure inside a storage cylinder 100 and the resulting need to relieve the pressure.

In instances where cylinder 100 is exposed to high temperatures, it may not be safe to release gas from inside cylinder 100 into the surrounding environment. In these circumstances, it would be desirable to delay the opening of the pressure-relief mechanism 201 for as long as possible. One such circumstance occurs when the elevated temperature is due to a fire and cylinder 100 is filled with oxygen. Release of oxygen into the surrounding fire may feed or intensify the fire where otherwise the fire may have suffocated or smoldered out without the additional oxygen. Similar conditions apply to cylinders containing toxic gases.

Container 101 provides an outer container 110 with a clamshell lid 120. Outer container 110 is comprised of a material capable of withstanding direct flame exposure without melting, for example, steel or stainless steel. Untreated aluminum, plastics or plywood are generally unsatisfactory as these materials will either melt or ignite when exposed to direct flame. Flame retardant treatments are generally undesirable. Carrying handles 170 may be disposed on any side of outer container 110; in addition, conventional lid latches 160 and corner protectors 150 may also be used.

The outer container 110 has a first inner layer of thermal insulation material 130, such as silica fiber or silica aerogel insulation. In addition to the first inner layer 130, a serpentine gas seal 180 (as detailed in FIG. 3) surrounds the top and bottom edges of the clamshell opening between the lower container 110 and lid 120. Thermal seal 180 prevents flames or hot gasses from entering into container 110 when lid 120 is closed and provides a thermally insulative barrier. Thermal seal 180 may be composed of various rigid and/or metallic materials with flame and heat resistant characteristics and may or may not be comprised of features of the internal liner.

A second inner layer 190 comprised of a thermally insulative material may be added to provide additional protection. Exemplary second inner layer 190 may be comprised of aluminum-faced fiberglass batting. A third inner layer 140 may take the form of a layer of durable cloth or molded heat-resistant plastic, and this layer receives gas cylinder 101.

Cylinder 100 may be equipped with a pressure relief mechanism 201 for releasing the compressed gas when the pressure inside cylinder 100 approaches a detrimental pressure level. In one embodiment, cylinder 100 and its corresponding valve may be enclosed in a protective bag.

Configuring the container as a clamshell design with lid 120 hingedly coupled to outer container 110 permits easy insertion and extraction of compressed gas cylinder 100. This is in direct contrast to the prior art containers that are end loading requiring the user of the container to lift the entire length of the compressed gas cylinder (e.g., 100) out of an over pack for cylinder extraction. This may create an unnecessary hazard and places an unnecessary ergonomic burden on cargo handlers. Container 101 also provides a convenient storage place for cylinder 100 since most compressed gas cylinders (e.g., 100) have a rounded bottom for increased strength thus restricting stand alone storage.

Embodiments disclosed are capable of keeping the temperature of cylinder 100 below 199° F. when container 101 is subjected to a temperature of 400° F. for three hours. A temperature of 199° F. is the approximate temperature at which most cylinders (e.g., 100) equipped with a pressure relief mechanism 201 will release their contents through the pressure relief mechanism 201 as specified in CFR 49, Part 178, Appendix D.

The outer container 110 by itself provides direct fire exposure protection for cylinder 100, and maintains the interior temperature below 400° F. when container 101 is subjected to a 1700° F. flame for 5 minutes as specified in CFR 49, Part 178, Appendix E.

Figure 3:
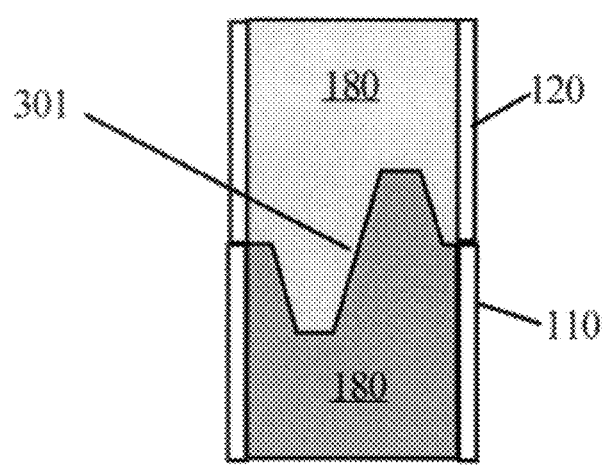
FIG. 3 is a cross-section of a serpentine seal.

FIG. 3 shows a cross-section of an exemplary serpentine gas seal 180. One portion of the gas seal 180 is in top section (lid) 120 and the mating portion 180 is in the bottom section

110. The gas seal is shown in two shades to better visualize the interface 301 that acts to prevent gasses from entering container 100 when it is in a closed position. Other overlapping geometries for gas seal 180 may be used and are considered within the scope of the present invention. Case seal 180 also provides structural attachment of top section 120 to bottom section 110.

While the embodiments described herein are described with certain specific characteristics, they are not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A container for shipping a compressed gas cylinder comprising:
   a flame resistant outer shell having a bottom section hingedly coupled to a top section;
   a first inner layer of thermal insulating material fitted into the top and bottom sections of the outer shell;
   a second inner layer of thermal insulating material fitted next to the first inner layer configured to contact and conform to surface sections of the compressed gas cylinder; and
   a durable internal lining constructed of fabric or molded heat-resistant plastic.

2. The container of claim 1, further comprising a serpentine thermal gas seal disposed between a lip of the top and bottom sections to inhibit intrusion of hot gases and flames into the container when closed.

3. The container of claim 1, wherein the fire resistant outer shell is made from an alloy of steel.

4. The container of claim 1, wherein the first inner layer is fabricated from a silica aerogel material.

5. The container of claim 1, wherein the second inner layer comprises silica aerogel or an aluminum faced fiberglass batting material that additionally provides shock protection.

6. The container of claim 1, wherein the inner layer is covered with a fabric closeout liner made from polyester or similar material, or alternatively a molded heat-resistant plastic liner.

7. The container of claim 2, wherein the serpentine seal is configured as mating halves, a first half, having a protrusion, fitted into the lip of the top section and a second, having a depression, fitted into the lip of the bottom section, wherein the protrusion mates with the depression thus forming a barrier against thermal gasses intrusion into the container.

8. The container of claim 2, wherein the serpentine seal is configured to provide additional structural rigidity to the container.

9. A container for shipping a tank having a source of a gas comprising:
   a flame resistant outer shell having a bottom section hingedly coupled to a top section;
   a first inner layer of thermal insulating material fitted into the top and bottom sections of the outer shell configured to contact and conform to surface sections of the tank;
   a second inner layer of thermal insulating material fitted next to the first inner layer configured to contact and conform to surface sections of the compressed gas cylinder; and
   a durable internal lining constructed of fabric or molded heat-resistant plastic.

10. The container of claim 9, further comprising a serpentine thermal gas seal disposed between a lip of the top and bottom sections to inhibit intrusion of hot gases and flames into the container when closed.

11. The container of claim 9, wherein the fire resistant outer shell is made from an alloy of steel.

12. The container of claim 9, wherein the first inner layer is fabricated from a silica aerogel material.

13. The container of claim 9, wherein the second inner layer comprises silica aerogel or an aluminum faced fiberglass batting material that additionally provides shock protection.

14. The container of claim 10, wherein the serpentine seal is configured as mating halves, a first half, having a protrusion, fitted into the lip of the top section and a second, having a depression, fitted into the lip of the bottom section, wherein the protrusion mates with the depression thus forming a barrier against thermal gases intrusion into the container.

15. The container of claim 9, wherein the tank comprises an oxygen generator.

16. An apparatus comprising:
   a compressed gas tank;
   a flame resistant outer shell having a bottom section hingedly coupled to a top section;
   a first inner layer of thermal insulating material fitted into the top and bottom sections of the outer shell;
   a second inner layer of thermal insulating material fitted next to the first inner layer configured to contact and conform to surface sections of the compressed gas tank; and
   a durable internal lining constructed of fabric or molded heat-resistant plastic.

* * * * *